United States Patent [19]
Bautis

[11] 3,929,667
[45] Dec. 30, 1975

[54] IMMERSION OIL FORMULATIONS FOR USE IN MICROSCOPY AND SIMILAR FIELDS

[75] Inventor: Arthur N. Bautis, Lyndhurst, N.J.

[73] Assignee: R. P. Cargille Laboratories, Inc., Cedar Grove, N.J.

[22] Filed: June 19, 1974

[21] Appl. No.: 480,630

[52] U.S. Cl. .................................. 252/408; 350/179
[51] Int. Cl.² .................... G01N 21/60; G02B 1/06
[58] Field of Search ........ 252/408, 59, 73; 350/179; 260/667

[56] References Cited
UNITED STATES PATENTS

| | | |
|---|---|---|
| 695,606 | 3/1902 | Grün .................................. 350/179 |
| 3,351,553 | 11/1967 | Hollinghurst ..................... 252/59 X |
| 3,437,402 | 4/1969 | Levins ................................. 350/179 |
| 3,753,905 | 8/1973 | Souillard et al ................... 252/59 X |

*Primary Examiner*—Leland A. Sebastian
*Assistant Examiner*—David Leland
*Attorney, Agent, or Firm*—Arthur L. Plevy

[57] ABSTRACT

Immersion oils for microscopy are described which employ a hydrogenated terphenyl formulation in conjunction with a polybutene compound to provide a non-toxic immersion oil with excellent optical properties.

10 Claims, No Drawings

IMMERSION OIL FORMULATIONS FOR USE IN MICROSCOPY AND SIMILAR FIELDS

BACKGROUND OF INVENTION

The field of microscopy and realted fields make widespread use of oil immersion optics as the objective lens and condenser lens on the microscope. Oil immersion optics provide higher resolution and brightness than dry optics or water immersion optics of equal magnifications. This is accomplished by design of a system that eliminates reflection and transmits the cone of light emanating from the condenser of the objective.

Immersion Oils function as follows:

In a microscope optical system, the visible image is composed of an infinite number of individual light rays. Each ray passes from the condenser through air, the slide, the mounting medium, the coverglass, air, and then enters the objective lens. The ray is refracted at each interface where there is a change in refractive index. When the ray passes from media of higher to lower refractive index, some reflection also occurs, causing loss of brightness. This is particularly true at each point where the ray passes through an air gap.

Air gaps cause greatest loss of light because the difference between air (refractive index 1.00) and all other transmission media is greater than the differences between any of the other media (refractive indices generally ranging from 1.500 to 1.525).

The oil immersion optics, then, utilize an immersion oil to fill the air gaps, providing a more homogeneous light path that avoids light loss from reflection, and improved brightness and resolution by the transmission of a narrower cone of light that can be collected by the objective lens.

The immersion oils available in the prior art possess refractive indexes at temperatures from 18°C to 35°C in the ranges of 1.510 to 1.524, depending upon the system and the refractive indexes of the optics utilized. Besides the above described use, such oils also found application as optical coupling agents, calibration liquids, fluid mounting media, protective coating and examination fluid and as a transparency medium. Such uses are due to the excellent optical and physical properties of these oils and have therefore resulted in such uses beyond the field of microscopy.

In any event, the vast majority of such prior art oils contain polychlorinated biphenyls (PCBs). Such substances are sold under the trade name of Aroclor and so on. PCBs are deleterious and damaging to the environment and are now regarded as toxic. Furthermore, since PCBs are relatively stable, they are not bio-degradeable but accumulate and therefore present a potential hazard to those who work extensively with the prior art immersion oils.

The prior art formulations typically contained a polychlorinated biphenyl which was blended or mixed with a mineral oil and viscosity adjusting agents to provide a good operating characteristic immersion oil; having the above described optical properties.

Thus, it is an object of this invention to provide a new and improved immersion oil possessing all the optical characteristics of the prior art oils while eliminating the pollution and toxicological problems inherently associated with the prior art formulations.

BRIEF DESCRIPTION OF PREFERRED EMBODIMENT

An immersion oil for use in microscopy consists essentially of a solution of a hydrogenated terphenyl, a polybutene and a mineral oil to provide a solution having a refractive index between 1.5100 and 1.5240.

DETAILED DESCRIPTION OF THE INVENTION

It has been determined that an immersion oil for microscopy can be formulated with excellent optical and physical characteristics, which oil contains insignificant traces of PCB, if any, thus eliminating a substantial environmental problem.

EXAMPLE I

Thirty-six percent of hydrogenated terphenyl was added to about 16 percent of polybutene which was placed in solution with about 48 percent of a mineral oil combination.

The hydrogenated terphenyl typically contains three benzene rings saturated with 40 percent hydrogen and has the following physical characteristics:

| | |
|---|---|
| Specific gravity (25°/15.5°C) | 1.001–1.007 |
| Viscosity at 37.8°C | 29 centistokes |
| Refractive index at 25°C | 1.560–1.575 |
| boiling point at 10mm Hg | 180°C |

The polybutene is 98 percent basic isobutylene chain with a 2 percent butene link. The physical characteristics of the polybutene used are as follows:

| | |
|---|---|
| Specific gravity at 60/60°F | 0.98 |
| Molecular weight | 1400 |
| Viscosity at 100°F, SSU | 123,000 |

The mineral oil is a standard type and consisted of about 23 percent of the mineral oil tradenamed Gloria and about 24 percent of the mineral oil tradenamed Kaydol. Both are white mineral oils containing some alkanes, naphthinics and straight and branch chains. The characteristics of the oils used are as follows:

| | KAYDOL | GLORIA |
|---|---|---|
| Specific gravity at 60°F | .880/.895 | .875/.885 |
| Viscosity, soybolt at 100°F | 345/355 | 200/210 |

The resultant solution used as an immersion oil had the tabulated (TABLE 1) pertinent characteristics depicting its excelent properties as a low viscosity, low flourescence oil for short focus objectives,, which oil further does not easily entrain air. It is noted that the above percentages are approximate and the exact amounts of constituents can be changed while still providing many of the benefits. The oil can also be used in the electronics field for protection against atmospheric degeneration of cathode emission coatings. The low neutralization equivalents, stability and the fact that it can be easily stripped with organic solvents make it suitable for this purpose. The oil can also serve as an examination fluid making residues identifiable because of the index difference. The oil serving both as a protective fluid and an examination fluid makes stripping and reimmersing for examination unnecessary.

EXAMPLE II

Thirty-one percent of the hydrogenated terphenyl was placed in solution with 41 percent of the above-described polybutene, to which solution was added about 28 percent of the mineral oil of the tradename Kaydol as above indicated.

This oil was a high viscosity type generally accepted for medical work and to be used by many suppliers of optical products as a standard accessory. The oil can also be used as a transparency medium as certain transparent materials and those with etched, ground or translucent surfaces become transparent when immersed in an oil as this, having the same refraction index. Since plastics, glasses and fibers have an index of about 1.5150, the oil can be used with such filters for transmitted light microscopy methods, with or without oil immersion objective lenses.

EXAMPLE III

In this solution about 17 percent of the hydrogenated terphenyl was placed in solution with 83 percent of a polybutene which as compared to the above noted polybutene, has a 99.8 percent basic isobutylene chain with a 0.2 percent butene link. The characteristics of this polybutene are as follows:

| | |
|---|---|
| Specific gravity at 60/60°F | .917 |
| Molecular weight | 2700 |
| Viscosity at 100°F, SSU | 890,000 |

The attendant oil as shown in the table has a very high viscosity and is used especially for inverted, horizontal and inclined instruments with very long focus objectives and wide condenser gaps. This high viscosity oil is lighter in color than a number of other media and is stable, thereby permitting rotation of mounted crystals and microfossils by a slight shifting of the cover glass of the slide. The oil can be used as an optical coupling agent and as a sealant between two optical elements.

The characteristics of the above examples are shown in the TABLE herein:

TABLE

PROPERTIES AND CHARACTERISTICS OF IMMERSION OILS

| EXAMPLE Oil | EXAMPLE I | II | III |
|---|---|---|---|
| Refractive Index at 25°C | | | |
| F line (4861 A) | 1.5236 | 1.5236 | 1.5227 |
| e line (5461 A) | 1.5180 | 1.5180 | 1.5176 |
| D line (5893 A) | 1.5150 | 1.5150 | 1.5150 |
| C line (6563 A) | 1.5115 | 1.5115 | 1.5118 |
| Dispersion: | | | |
| nf–nc | 0.0122 | 0.0122 | 0.0109 |
| Abbe V | 42.6 | 42.6 | 47.2 |
| Temperature Coefficients | | | |
| (–dn/dt) 15°–35°C | 0.00033 | 0.00031 | 0.00031 |
| Stability (dn. 25°C after 24 hrs. at temp. | | | |
| 60°C | 0 | 0 | 0 |
| 100°C | 0 | 0 | 0 |
| Flourescence relative to Cedarwood Oil | | | |
| (Ultra-violet) Short Wave | Low | Low | Low |
| Long Wave | Low | Low | Very Low |
| Color (Gardner) | 1 | 1 | 1 |
| Viscosity (25°C) | 150 cs (low) | 1250 cs (high) | 120,000 cs (very high) |
| Density at 20°C | | | |
| gm/ml | 0.919 | .921 | .910 |
| lb/gal U.S. | 7.59 | 7.61 | 7.52 |
| Cloud Point | 0°C | 0°C | 0°C |
| Flash Point (Cleveland Open Cup) | 325°F | 325°F | 325°F |
| Neutralization Equiv. (mg KOH) | 0.01 Max. | 0.01 Max. | 0.01 Max. |

Thus, there has been described specific formulation for pollution-free immersion oils which oils contain virtually no PCB, are stable, have good optical properties and in general, provide improved or compatible performance with those of the prior art.

The above examples were set forth merely as illustrations of the present invention and are not intended to limit the scope thereof. It will therefore be obvious to those skilled in the art that percentages may be changed or varied as well as additional constituents added without departing from the scope of the invention as set forth in the claims hereto appended.

I claim:

1. An immersion oil for use in the field of microscopy and related fields thereto, consisting essentially of a hydrogenated terphenyl in solution with at least one compound selected from the group consisting of polybutene derivatives and mineral oil to provide an index of refraction between the range of 1.5100 and 1.5240.

2. The oil according to claim 1 wherein the amount of said hydrogenated terphenyl in said solution is between 10 to 60 percent.

3. The oil according to claim 1 wherein said compound comprises a polybutene derivative.

4. The oil according to claim 3 wherein said at least one compound further includes a mineral oil.

5. An immersion oil for use in microscopy and related fields consisting essentially of a solution of a hydrogenated terphenyl with a polybutene to provide a solution having a refractive index between 1.5100 and 1.5240.

6. The oil according to claim 5 further including a mineral oil.

7. The oil according to claim 5 wherein said polybutene is selected from a group having between 98 to 99.8 percent of a basic ISO butylene chain.

8. The oil according to claim 5 wherein said mineral oil is of the type having a specific gravity at 60° F between 0.875 and 0.895.

9. The immersion oil according to claim 5 wherein said hydrogenated terphenyl is of the type having three benzene rings with about 40 percent hydrogen and exists in said solution at a percentage between 10 to 60.

10. The oil according to claim 5 wherein said polybutene has a viscosity in the range between 120,000 to 900,000.

* * * * *